CIRCUITS HAVING NEGATIVE RESISTANCE CHARACTERISTICS

Filed Jan. 2, 1962 5 Sheets-Sheet 1

INVENTOR.
CARL D. TODD,
BY
Walter J. Adam
ATTORNEY.

Dec. 14, 1965 C. D. TODD 3,223,849

CIRCUITS HAVING NEGATIVE RESISTANCE CHARACTERISTICS

Filed Jan. 2, 1962 5 Sheets-Sheet 2

INVENTOR.
CARL D. TODD,
BY
Walter J. Adam
ATTORNEY.

CIRCUITS HAVING NEGATIVE RESISTANCE CHARACTERISTICS

Filed Jan. 2, 1962 5 Sheets-Sheet 3

INVENTOR.
CARL D. TODD,
BY
Walter J. Adam
ATTORNEY

INVENTOR.
CARL D. TODD,
BY
Walter J. Adam
ATTORNEY.

CIRCUITS HAVING NEGATIVE RESISTANCE CHARACTERISTICS

Filed Jan. 2, 1962 5 Sheets-Sheet 5

INVENTOR.

CARL D. TODD,

BY

Walter J. Adam

ATTORNEY.

United States Patent Office 3,223,849
Patented Dec. 14, 1965

3,223,849

CIRCUITS HAVING NEGATIVE RESISTANCE CHARACTERISTICS

Carl D. Todd, Costa Mesa, Calif., assignor to Hughes Aircraft Company, Culver City, Calif., a corporation of California

Filed Jan. 2, 1962, Ser. No. 163,808
3 Claims. (Cl. 307—88.5)

This invention relates to negative resistance circuits and particularly to improved circuits or devices including semiconductor elements and exhibiting S-type negative resistance characteristics.

Customarily, negative resistance devices are divided into the major classes of N-type or current stable devices and S-type or voltage stable devices. In a graph having current plotted on the X axis and voltage plotted on the Y axis, the curves representing the characteristics of the N-type and S-type devices respectively have the shape of the letter N or the letter S. Depending upon the particular result desired, one or the other type or either type may be utilized. Some conventional S-type negative resistance devices are the vacuum tube tetrode as used in the dynatron oscillator, the point contact transistor as used in the common emitter configuration and the tunnel diode. In many instances, it is desirable that the negative resistance be relatively linear over a wide range of voltage or current swing. Conventional negative resistance devices have relatively poor linearity in the negative resistance region which may cause undesirable operation in many applications. Also, many conventional negative resistance devices do not have the property that the basic parameters may be easily varied according to desired requirements.

It is therefore an object of this invention to provide a negative resistance device having an S-type voltage-current characteristic and a negative resistance that is relatively linear over a wide range of voltage or current.

It is a further object of this invention to provide an S-type negative resistance device utilizing semiconductor elements and providing a highly linear negative resistance over a wide range of voltage and current.

It is another object of this invention to provide an improved negative resistance circuit that may be utilized as a two terminal or a three terminal device.

It is still another object of this invention to provide S-type negative resistance devices having arrangements for varying or selecting desired operating characteristics.

Briefly, in accordance with the invention an emitter follower transistor is coupled to a common base transistor of the opposite type to form a current amplifier. The output terminals may be coupled to the electrodes of the common base transistor. Current is supplied to the base of the emitter follower transistor both from a voltage source through a first resistor and from the output terminals through a feedback path including a second resistor so as to provide a negative resistance. In a three terminal arrangement in accordance with the invention, a control terminal is also coupled to the base of the emitter follower transistor.

The novel features of this invention, as well as the invention itself, both as to its organization and method of operation, will best be understood from the accompanying description taken in connection with the accompanying drawings, in which like characters refer to like parts, and in which.

Figure 1:
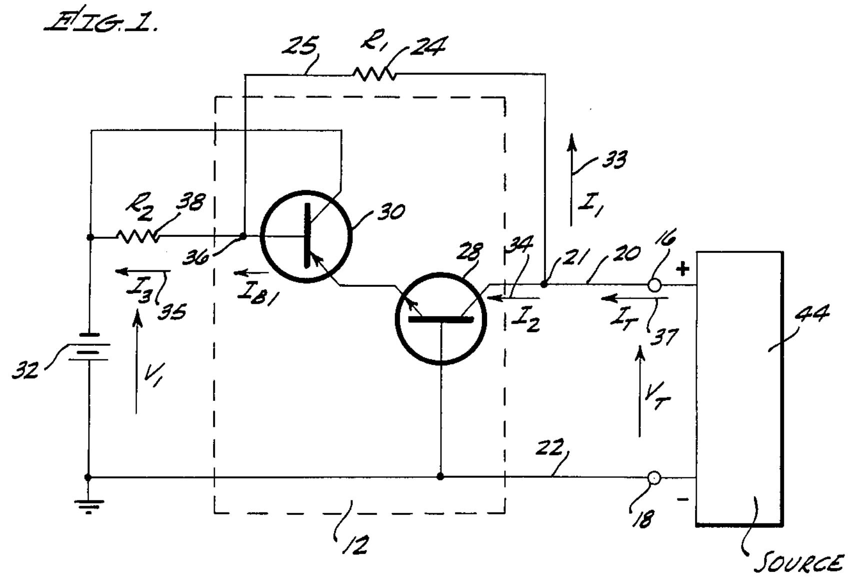
FIG. 1 is a schematic circuit diagram of a two terminal circuit in accordance with this invention providing an S-type negative resistance characteristic.
Figure 4:
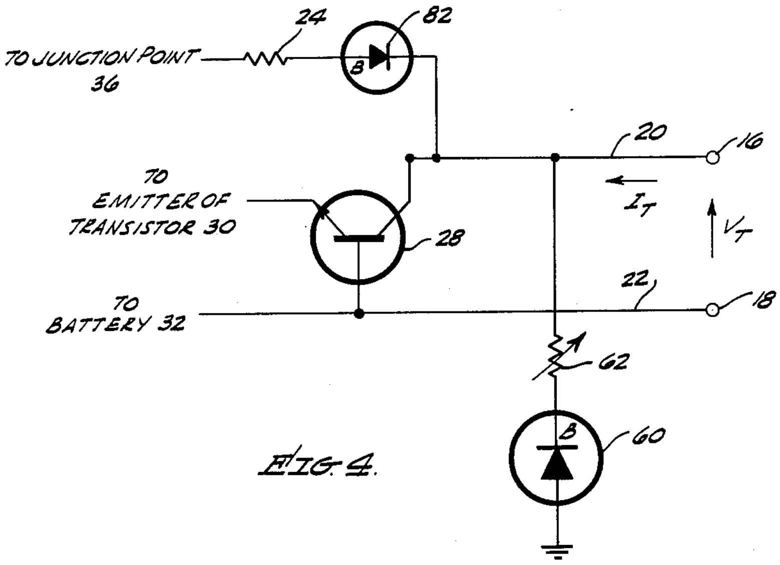
Figure 5:
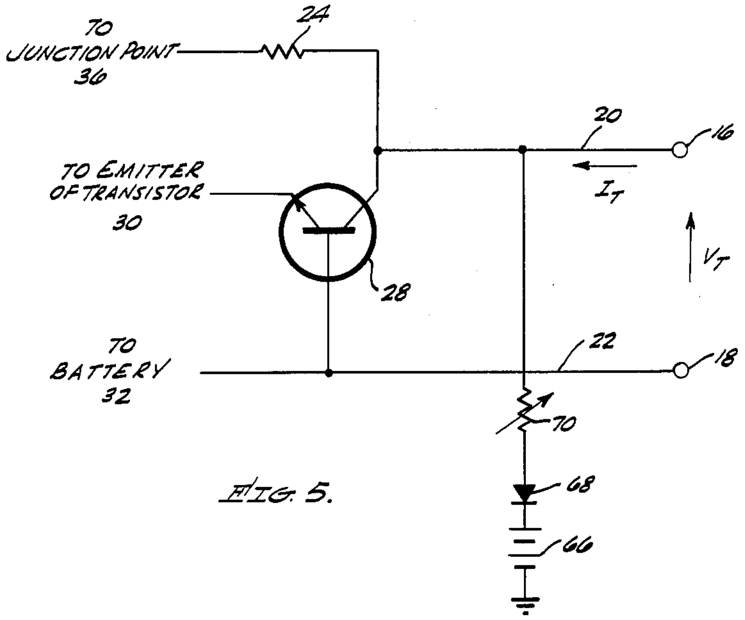
Figure 6:
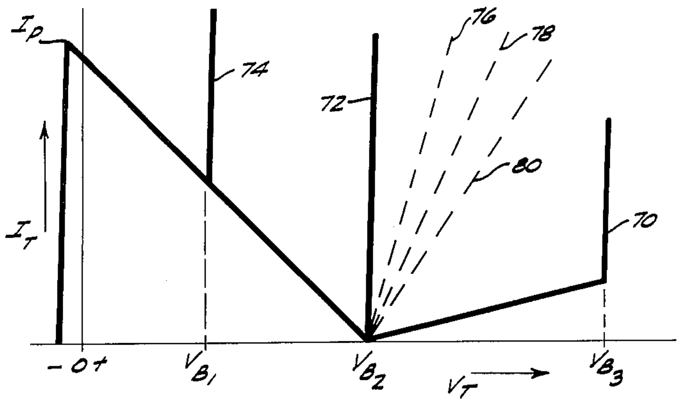
Figure 7:
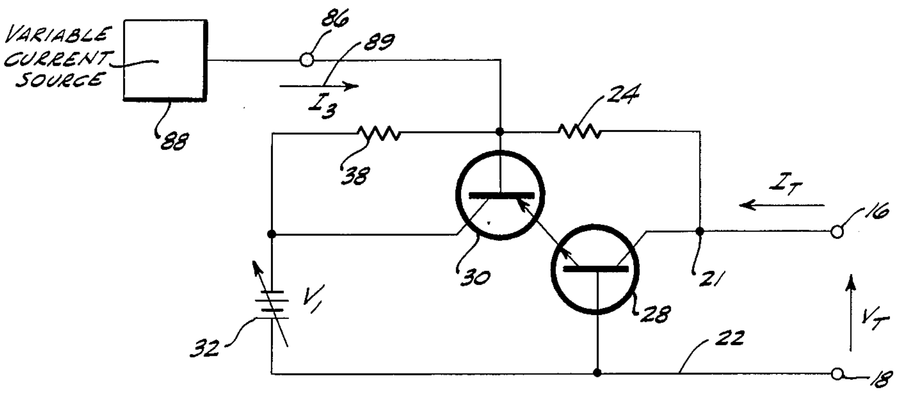
Figure 8:
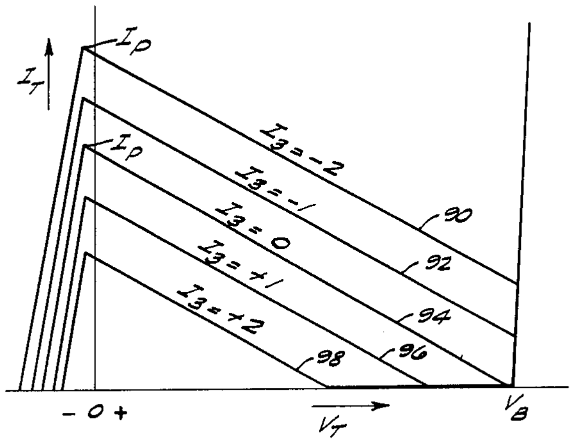
Figure 9:
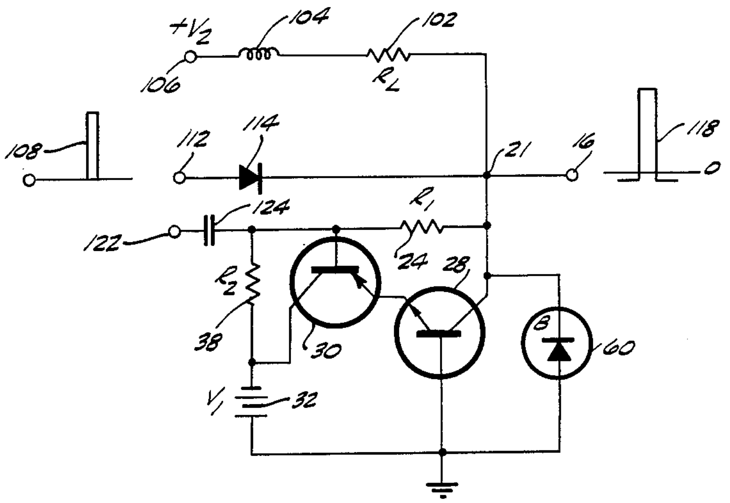
Figure 10:
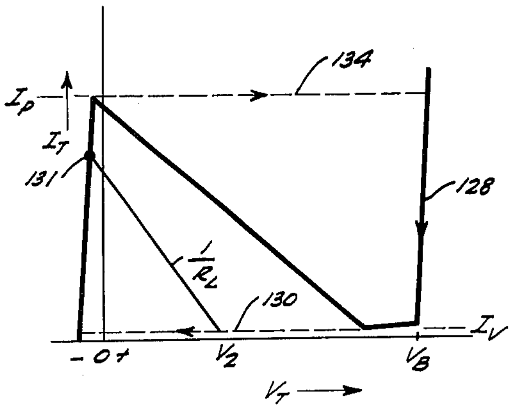

FIG. 4 schematically illustrates a circuit in accordance with the invention for providing a control of the breakdown voltage of the negative resistance circuit of FIG. 1;

FIG. 5 is a schematic circuit diagram of a second arrangement in accordance with this invention for providing a control of the breakdown voltage of the negative resistance circuit of FIG. 1;

FIG. 6 is a graph of terminal current versus terminal voltage for explaining the controlled negative resistance characteristics developed by the circuit of FIG. 5;

FIG. 7 is a schematic circuit diagram of a three terminal negative resistance device in accordance with this invention;

FIG. 8 is a graph of terminal current versus terminal voltage for explaining the controlled negative resistance characteristics of the circuit of FIG. 7;

FIG. 9 is a schematic circuit diagram of a monostable circuit in accordance with the invention;

FIG. 10 is a graph of current versus voltage for explaining the operating characteristics of the monostable circuit of FIG. 9.

Referring to the basic circuit in accordance with the invention, which is illustrated in FIG. 1, a current amplifier 12 having a current gain $A_I$ is provided coupled to first and second terminals 16 and 18 through respective leads 20 and 22. The terminals 16 and 18 may be considered output terminals in the two terminal arrangement.

The lead 20 is also coupled to the current amplifier 12 by a feedback resistor 24 and a lead 25, the resistor 24 having a value $R_1$. The current amplifier 12 includes an n-p-n type common base transistor 28 which drives the emitter of an emitter follower transistor 30 of the p-n-p type. The collector of the transistor 28 is coupled to the lead 20 through a common point 21 and the base is coupled to the reference potential on the lead 22. The collector of the transistor 30 is coupled to the negative terminal of a source of potential such as a battery 32 having a positive terminal coupled to the lead 22 and the base of the transistor 30 is coupled to a junction point 36. A base resistor 38 having a value $R_2$ is coupled between the junction point 36 and the negative terminal of the battery 32. The junction point 21 is coupled through a resistor 24, having a value $R_1$, to a lead 25 which is coupled to the junction point 36. Currents $I_1$ and $I_{B1}$ flow into the junction point 36 respectively from the lead 25 and from the base of the transistor 30. The current $I_3$ flows from the junction point 36 and may have a substantially constant value. The current $I_T$ flows into the terminal 16 with the currents $I_1$ and $I_2$ flowing respectively from the junction point 21 to the resistor 24 and to the collector of the transistor 28. The D.C. (direct current) voltage developed across the battery 32 is represented by $V_1$ and the voltage applied across the input terminals 16 and 18 is shown as an instantaneous voltage value designated as $V_T$ which may be applied from a source 44.

Figure 2:
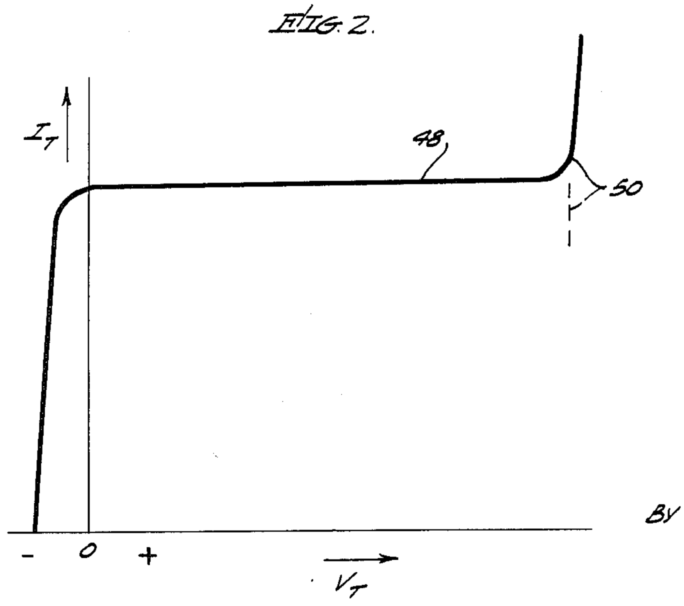
FIG. 2 is a graph of current versus voltage for explaining the operation of the circuit of FIG. 1 without the feedback arrangement.

For explaining the operation of the circuit of FIG. 1, it will be first assumed that the feedback path of the resistor 24 is nonexistent. Thus, the output terminals are effectively those of a common base transistor with a constant emitter bias resulting in a terminal current versus terminal voltage characteristic shown by a curve 48 of FIG. 2. For a terminal voltage $V_T$ which is slightly negative because of the saturation condition of the transistor, the output resistance of the transistor 28 or circuit terminal resistance is relatively low, that is, the curve 48 has a relatively steep slope. As the voltage $V_T$ changes to zero or positive, the output resistance increases greatly for the transistor 28 as that transistor goes out of saturation. The output resistance is then equal to the reciprocal of $h_{ob}$ for the transistor 28, where $h_{ob}$ is the common emitter small-signal output admittance with the input A.C. (alternating current) open-circuited. When the terminal voltage $V_T$ attempts to exceed the collector-to-base breakdown voltage of the transistor 28 at 50, the output resistance again decreases sharply. The collector breakdown voltage at the high voltage $V_T$ at 50 may result from avalanching within the transistor 28, as is well known in the art.

The further operation of the circuit of FIG. 1 will be explained with the feedback resistor 24 connected into the circuit to form a characteristic negative resistance curve 54 of FIG. 3. The current flowing through the feedback resistor 24 in the region where the transistor 28 is saturated or when $V_T$ is negative or at zero volts is approximately zero so that the curve 54 is substantially the same as the curve 48 (FIG. 2) in that region. As $V_T$ is increased the current $I_1$ also must increase as the voltage at the junction point 36 remains relatively constant. The voltage at the junction point 36 remains relatively constant as long as the emitter-to-base diodes of the transistors 28 and 30 are conducting As the terminal voltage $V_T$ increases the current $I_1$ increases and the base current $I_{B1}$ decreases because the current $I_3$ flowing through the resistor 38 is relatively constant. Thus the current $I_1$ bucks or subtracts from the base current $I_{B1}$. The net change in base current $I_{B1}$ is a decrease equal to the change of current $I_1$. When $I_{B1}$ decreases, the collector current of the transistor 28 will decrease and due to the net current gain in the two transistors, the decrease in current $I_2$ into the collector of the transistor 28 is greater than the initial increase of current $I_1$. The net result is a decrease in the total terminal current $I_T$ for the given increase in terminal voltage $V_T$. This change represents a negative resistance. The curve 54 decreases to a valley current $I_V$ at which the current $I_1$ equals the current $I_3$ and the base current $I_{B1}$ is reduced to a very small leakage current.

To further explain the circuit of FIG. 1 the operation will first be analyzed by considering the current amplifier 12 of FIG. 1 having the gain $A_i$ as a composite element having zero input resistance and an infinite output resistance. When a small signal A.C. voltage $V_t$ is applied to the terminals 16 and 18, a current $I_1$ must flow.

$$I_1=\frac{V_t}{R_1} \qquad (1)$$

This current $I_1$ is then amplified by $A_i$ and the current $I_2$ is thus:

$$I_2=\left(\frac{V_t}{R_1}\right)A_i \qquad (2)$$

The total terminal current $I_t$ is the sum of $I_1$ and $I_2$ and is $$I_t=\frac{V_t}{R_1}+\left(\frac{V_t}{R_1}\right)A_i \qquad (3)$$

The terminal resistance $R_T$ at the terminals 16 and 18 is therefore:

$$R_T=\frac{V_t}{I_t}=\frac{R_1}{(1+A_i)} \qquad (4)$$

Thus, if the current gain $A_i$ is negative and has a magnitude greater than unity, the terminal resistance will be negative.

The over all current gain considering the elements of the current amplifier 12 may be approximated by:

$$A_i \cong (1+h_{fe_1})(h_{fb_2}) \qquad (5)$$

where $h_{fe_1}$ is the common-emitter current gain of the transistor 30, that is, the ratio of collector current to base current, and $h_{fb_2}$ is the common base current gain of the transistor 28 or ratio of collector to emitter current. Inserting Equation 5 into Equation 4 gives the following expression for terminal resistance:

$$R_T=\frac{R_1}{1+(1+h_{fe_1})(h_{fb_2})} \qquad (6)$$

where $h_{fb_2}$ is negative because of the phase reversal of the transistor 28. Although $h_{fb_2}$ characteristically has a negative value less than unity, it may be assumed to be equal to $-1$ without incurring appreciable error to give $$R_T \cong \frac{-R_1}{h_{fe_1}} \qquad (7)$$

In the above analysis showing the negative resistance developed by the circuit of FIG. 1, the effect of the output resistance of the transistor 28 (the $h_{ob}$ of the transistor 28) was neglected. As the emitter of the transistor 28 is supplied from a relatively high resistance, the output resistance is approximately equal to the reciprocal of $h_{ob_2}$ which is the common-emitter small-signal output admittance of the transistor 28 with the input A.C. open-circuited. The value of $h_{ob}$ is given by the slope of the characteristic curve 48 of FIG. 2. For a terminal voltage at the terminals 16 and 18 between zero and the breakdown voltage $V_B$, the output resistance is normally very high. At a low negative value of $V_T$, the output resistance is low as shown by curve 54 of FIG. 3 but increases sharply even before a zero value of $V_T$ is reached. Also at very high values of $V_T$, the output resistance decreases sharply as the transistor breaks down at $V_B$.

As the terminal voltage $V_T$ is increased, the current $I_1$ increases and the base current $I_{B1}$ of the transistor 30 decreases as well as the emitter current of the transistor 28. A level is reached as $V_T$ is increased where the operating bias currents of the transistors 28 and 30 is so low that the current gain of both transistors approaches zero with the transistor 30 having the greatest effect. The result as may be seen from Equation 6 is to increase the magnitude of $R_T$. The terminal resistance as seen by Equation 6 will become infinite as $V_T$ increases to reverse bias the transistor 30 and then approach the value of $R_1$. Also, when the emitter-to-base junction of the transistor 30 is reverse biased as shown at the portion 55 of the curve 54, the terminal resistance at the terminals 16 and 18 becomes equal to the sum of $R_1$ and $R_2$. This terminal resistance is true only in the region of the portion 55 before the emitter-to-base of the transistor 28 breaks down.

When the terminal voltage $V_T$ increases to the breakdown voltage $V_B$ of the transistor 28, the $h_{ob_2}$ increases sharply and the net value of the terminal resistance $R_T$ reaches a low positive value as shown by the slope of the right hand portion of the curve 54. It is to be noted that the valley point $I_V$ where $R_T$ is infinite may be determined by the decrease in gain of the transistor 30 or in some arrangements, as will be discussed subsequently, by the collector breakdown voltage of the transistor 28. The curve 54 in the negative resistance region has a slope $1/R_n$ where $R_n$ is the negative resistance at the terminals 16 and 18. The linearity of the negative resistance portion of the curve 54 is primarily dependent upon the variation of $h_{fe_1}$ of the transistor 30 with changes of operating current level. The negative resistance has been found to be highly linear in the circuits in accordance with this invention.

To explain the design flexibility of the circuits in accordance with this invention some of the design factors will be considered. The most important parameter for A.C. consideration is the magnitude of the terminal resistance $R_n$ in the negative resistance region. Parameters of interest in switching and in relaxation circuits, as well as in biasing considerations, are primarily the currents and voltages defining the peak and valley points and the voltage $V_B$ at which the low terminal resistance is reached. For purposes of design it may be assumed that the voltage $V_1$ of the battery 32 of FIG. 1 is constant and fixed and the values of $h_{fe_1}$ and $h_{FE_1}$ of the transistor 30 are fixed. The characteristic $h_{FE_1}$ is the static D.C. forward current transfer ratio for the common emitter configuration of a transistor. The parameters $h_{fb_2}$ and $h_{FB2}$ and $h_{ob2}$ of the transistor 28 may be neglected when considering the negative resistance region. As is well known, the parameter $h_{FB_2}$ is the static D.C. forward current transfer ratio for the common base configuration and $h_{ob_2}$ is the common base small signal output admittance with the input of the transistor A.C. open-circuited.

When designing for a desired value of negative resistance $R_n$, the value of the resistance $R_1$ may be determined by:

$$R_1=h_{fe_1}R_n \quad (8)$$

Once the value of $R_1$ is determined, the value of $R_2$ may be chosen either to give the desired peak current $I_P$ or the necessary valley voltage $V_V$. If a specific value of peak current $I_P$ is required, the value of $R_2$ may be determined from the following relationship:

$$R_2=\left(\frac{V_{BE_1}+V_{EB_2}-V_1}{I_P}\right)(1+h_{FE_1}) \quad (9)$$

where $V_{BE_1}$ is the static D.C. value of the base-to-emitter voltage of the transistor 30 and $V_{EB_2}$ is the instantaneous total value of the voltage appearing between the emitter and the base of the tranisstor 28. After choosing the value of the negative resistance $R_n$, the resulting valley voltage $V_V$ will be:

$$V_V=R_nI_P \quad (10)$$

If design requirements make it necessary to design for a specific valley voltage, the value of $R_2$ may be determined from the following equation:

$$R_2=\frac{(V_{BE_1}+V_{EB_2}-V_1)(1+h_{FE_1})R_n}{V_V} \quad (11)$$

In the design of the circuits in accordance with the invention, if the voltage $V_1$ of the battery 32 may be selected, the value should be large with respect to the sum of the emitter-to-base diode drops of the transistors 28 and 30 in order to decrease the effect of temperature on the parameters $V_{BE_1}$ and $V_{EB_2}$. If this condition is not met by selecting a large value of $V_1$, the peak current $I_P$ will increase as the temperature rises. It is to be noted that $I_P$ is only affected a small amount by changes of $h_{FE_1}$.

Figure 3:
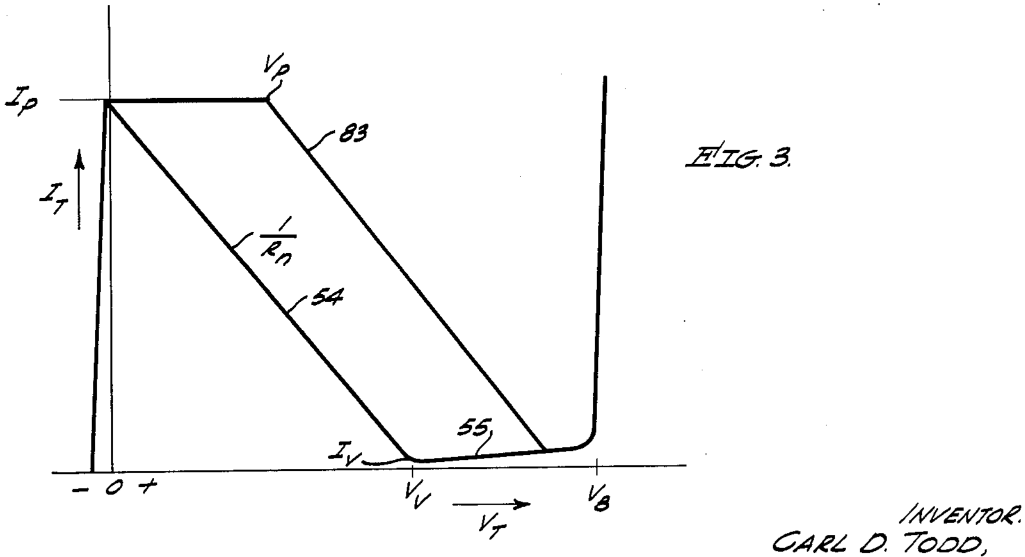
FIG. 3 is a graph of current versus voltage for expaining the negative resistance characteristics of the circuit of FIG. 1.

Because the breakdown voltage $V_B$ of FIG. 3 is relatively high, an arrangement is provided in accordance with this invention for controlling the breakdown voltage. By lowering the breakdown voltage, excessive power dissipation in the transistor 28 is prevented when operating at high current levels. The arrangement of FIG. 4 includes a breakdown diode 60 having an anode coupled to ground which may be the same reference level as the lead 22. The breakdown diode 60 may be a diode having Zener or avalanche breakdown characteristics for example. The cathode of the breakdown diode 60 is coupled through a resistor 62 to the input lead 20. The arrangement of FIG. 5 includes a source of clamping voltage such as a battery 66 having a negative terminal coupled to ground and having a positive terminal coupled to the cathode of a unidirectional device such as a diode 68. The anode of the diode 68 is coupled through a resistor 70 to the input lead 20.

In operation the breakdown diode 60 of FIG. 4 is selected to provide breakdown at a voltage $V_B$ before the breakdown of the transistor 28 as shown by curves 70, 72 and 74 of FIG. 6. It is to be noted that the curves 70, 72 and 74 represent operation with the resistors 62 and 70 made to have zero value. The clamping voltage of the battery 66 in the arrangement of FIG. 5 may be selected to provide the desired breakdown point as shown by the curves 70, 72 and 74, for example. As the voltage $V_T$ increases to $V_{B1}$, $V_{B2}$ or $V_{B3}$, either the diode 60 of FIG. 4 breaks down or the diode 68 of FIG. 5 is biased into conduction.

The resistor 62 in series with the breakdown diode 60 or the resistor 70 in series with the diode 68 can be varied to obtain additional characteristics. Varying the value of the resistors 62 and 70 adds to the A.C. resistance of the composite circuit to provide characteristics of dotted curves 76, 78 or 80, respectively, resulting from increasing the value of the resistors.

Another arrangement in accordance with this invention is by coupling a breakdown diode 82 in series with the resistor 24 as shown in FIG. 4. The breakdown diode 82 may be a diode having Zener or avalanche breakdown characteristics, for example. As a result, the peak voltage $V_p$ as shown by a curve 83 in FIG. 3 may be increased to any desired level. The peak voltage $V_P$ will be approximately equal to the selected breakdown voltage of the diode 82.

Another circuit in accordance with this invention utilizes the base of the emitter follower transistor 30 as a third terminal as shown in FIG. 7. A terminal 86 which may be coupled to a current source 88 is coupled to the base of the transistor 30. The current source 88 provides a selected current to the base of the transistor 30 to vary the characteristics as shown by curves 90, 92, 94, 96 and 98 of FIG. 8. A positive current bias, when current flows in the direction of an arrow 89 from the variable current source 88, decreases the peak current $I_P$ from the value obtained when $I_3$ has a zero value (curve 94) to the values of the curves such as 96 and 98. A negative current applied from the source 88 so that current flows in a direction opposite the source 88 so that current flows in a direction opposite to the arrow 89 increases the peak current $I_P$ as shown by the curves 92 and 90. It is to be noted that in the arrangement of FIG. 7, the negative resistance slopes of the curves such as 92 and 96 are the same. This constant negative resistance slope results because the current gain of the transistors 28 and 30 and the value of the feedback resistor 24 have remained substantially constant. The breakdown voltage $V_B$ is independent of the emitter follower transistor 30 and the voltage $V_B$ does not change with current applied to the base of the transistor 30.

Another arrangement in accordance with this invention to generate the family of curves of FIG. 8 is to vary the value of the supply voltage $V_1$ of the battery 32 or by varying the value of the resistor 38.

It is to be noted that the types of transistors shown are to illustrate the invention and that opposite type transistors may be utilized in accordance with this invention with the biasing voltages appropriately changed in a conventional manner.

The composite negative resistance circuits described above may be utilized in a variety of applications such as oscillators, pulse amplifiers, Q multipliers and switches, for example. The ability to choose the parameters of the S-type negative resistance circuits allows very wide use thereof. In FIG. 9 the composite negative resistance circuit is arranged as a monostable multivibrator in accordance with this invention. The breakdown diode 60 is coupled between ground and the collector of the transistor 28 to select a breakdown voltage $V_B$ as shown in FIG. 10. The junction point 21 is coupled through a load resistor 102 having a value $R_L$ and an inductor 104 to a positive source of potential $+V_2$ such as a terminal 106 for providing a constant current source. A positive trigger signal or voltage of a waveform 108 may be applied to a terminal 112 through a switching diode 114 to the junction point 21 to form an output voltage pulse of a waveform 118. Also, the circuit may be considered as a three terminal device as previously discussed, and the positive trigger pulse of the waveform 108 may be applied to a terminal 122 and through a coupling capacitor 124 to the base of the transistor 30.

In operation, a curve 128 of FIG. 10 shows the negative resistance characteristic of the circuit of FIG. 9. The current and voltage normally applied to the output terminal 16 is at a stable point 131 as determined by a load line $1/R_L$. In response to a trigger signal of the waveform 108 applied either to the terminals 112 or 122, the peak current $I_P$ is exceeded and the circuit changes state through the negative resistance region along a path such as 134 to the breakdown voltage $V_B$ as determined by the diode 60 breaking down. As the trigger signal of the waveform 108 has a relatively short duration, the circuit changes state along the curve 128 to a very low terminal current $I_T$ which decreases to a value equal to $I_V$ and then switching action occurs along a path 130 to a negative value of $V_T$ and back to the point 131. Because of the clamping action of the breakdown diode 60, the output pulse of the waveform 118 has a relatively flat top portion. When the circuit is triggered at the terminal 112, a relatively low power is required because of the circuit gain.

Thus, there has been described a composite circuit exhibiting an S-type negative resistance characteristic utilizing in its simplest form, only two resistors and two transistors. Because of the arrangement of the elements the negative resistance is relatively linear over a wide range of voltage or current swing. The composite circuit may be widely used because of flexibility of design and modifications of the circuit characteristics.

What is claimed is:

1. A circuit for providing a current-voltage characteristic having a linear negative resistance portion of preselected magnitude between first and second positive resistance portions comprising: first and second terminals between which said current-voltage characteristic is provided; a source of potential having one of its terminals connected to said second terminal; first and second transistors of opposite conductivity types each having an emitter, a collector and a base; the collector and base of said first transistor being directly connected to said first and second terminals, respectively; the emitter of said first transistor being directly connected to the emitter of said second transistor; the collector of said second transistor being directly connected to the other terminal of said source of potential; resistance means connected between the base of said second transistor and said other terminal of said source of potential for providing a substantially constant current flow therebetween; and a feedback resistor connected between the collector of said first transistor and the base of said second transistor for decreasing the base current of said second transistor in response to an increase in voltage between said first and second terminals; said feedback resistor having a resistance value equal in magnitude to the common emitter current gain of said second transistor times said preselected magnitude of said linear negative resistance.

2. A circuit for providing a current-voltage characteristic having a linear negative resistance portion of preselected magnitude between first and second positive resistance portions, said negative resistance portion intersecting said first positive resistance portion at a preselected peak current and intersecting said second positive resistance portion at a valley voltage, comprising: first and second terminals between which said current-voltage characteristic is provided; a source of potential having one of its terminals connected to said second teminal; first and second transistors of opposite conductivity types each having an emitter, a collector and a base; the collector and base of said first transistor being directly connected to said first and second terminals, respectively; the emitter of said first transistor being directly connected to the emitter of said second transistor; the collector of said second transistor being directly connected to the other terminal of said source of potential; a feedback resistor connected between the collector of said first transistor and the base of said second transistor for decreasing the base current of said second transistor in response to an increase in voltage between said first and second terminals, said feedback resistor having a resistance value $R_1$ given by $$R_1 = h_{fe_2} R_n$$

where $h_{fe_2}$ is the common emitter current gain of said second transistor and $R_n$ is said preselected magnitude of said linear negative resistance; a second resistor connected between the base of said second transistor and said other terminal of said source of potential, said second resistor having a resistance value $R_2$ given by $$\left[R_2 = \frac{V_{BE_2} + V_{EB_1} - V_1}{I_P}\right][1 + h_{FE_2}]$$

where $V_{BE2}$ is the static D.C. value of the base-to-emitter voltage of said second transistor, $V_{EB1}$ is the instantaneous total value of the voltage between the emitter and base of said first transistor, $V_1$ is the voltage provided by said source of potential, $h_{FE2}$ is the static D.C. forward current transfer ratio of said second transistor, and $I_P$ is said preselected peak current.

3. A circuit for providing a current-voltage characteristic having a linear negative resistance portion of preselected magnitude between first and second positive resistance portions, said negative resistance portion intersecting said first positive resistance portion at a peak current and intersecting said second positive resistance portion at a preselected valley voltage, comprising: first and second terminals between which said current-voltage characteristic is provided; a source of potential having one of its terminals connected to said second terminal; first and second transistors of opposite conductivity types each having an emitter, a collector and a base; the collector and base of said first transistor being directly connected to said first and second terminals, respectively; the emitter of said transistor being directly connected to the emitter of said second transistor; the collector of said second transistor being directly connected to the other terminal of said source of potential; a feedback resistor connected between the collector of said first transistor and the base of said second transistor for decreasing the base current of said second transistor in response to an increase in voltage between said first and second terminals, said feedback resistor having a resistance value $R_1$ given by $$R_1 = h_{fe_2} R_n$$

where $h_{fe_2}$ is the common emitter current gain of said second transistor and $R_n$ is said preselected magnitude of said linear negative resistance; a second resistor connected between the base of said second transistor and said other terminal of said source of potential, said second resistor having a resistance value $R_2$ given by $$R_2 = \frac{(V_{BE_2} + V_{EB_1})(1 + h_{FE_2}) R_n}{V_V}$$

where $V_{BE2}$ is the static D.C. value of the base-to-emitter voltage of said second transistor, $V_{EB1}$ is the instantaneous total value of the voltage between the emitter and base of said first transistor, $V_1$ is the voltage provided by said source of potential, $h_{FE2}$ is the static D.C. forward current transfer ratio of said second transistor, and $V_V$ is said preselected valley voltage.

References Cited by the Examiner

UNITED STATES PATENTS

| | | | |
|---|---|---|---|
| 2,588,925 | 3/1952 | Hecht | 330—112 |
| 2,879,412 | 3/1959 | Hoge et al. | 307—88.5 |
| 2,885,495 | 5/1959 | Sziklai et al. | 330—20 |
| 2,912,654 | 11/1959 | Hansen | 330—20 |
| 2,943,282 | 6/1960 | Pfieffner | 333—80 |
| 2,986,651 | 5/1961 | Schayes | 307—88.5 |

(Other references on following page)

UNITED STATES PATENTS

| | | | |
|---|---|---|---|
| 2,992,340 | 7/1961 | Floyd | 307—88.5 |
| 3,003,114 | 10/1961 | Wedig | 330—20 |
| 3,014,663 | 12/1961 | Horton et al. | 328—241 |
| 3,023,368 | 2/1962 | Erath | 330—20 |

FOREIGN PATENTS

| | | |
|---|---|---|
| 1,189,825 | 4/1956 | France. |
| 1,094,302 | 12/1960 | Germany. |

OTHER REFERENCES

Suran et al.: Two Terminal Analizers and Synthesis of Junction Transistor Multivibrators, IRE Transactions, March 1956.

ARTHUR GAUSS, *Primary Examiner.*

HERMAN K. SAALBACH, JOHN W. HUCKERT, *Examiners.*

UNITED STATES PATENT OFFICE

CERTIFICATE OF CORRECTION

Patent No. 3,223,849 December 14, 1965

Carl D. Todd

It is hereby certified that error appears in the above numbered patent requiring correction and that the said Letters Patent should read as corrected below.

Column 2, lines 4 and 5, for "expaining" read -- explaining --; column 5, line 7, strike out "and", and insert instead a comma; column 6, line 35, strike out "that current flows in a direction opposite the source 88 so"; column 8, line 15 and 16, the formula should appear as shown below instead of as in the patent:

$$R_2=\left[\frac{V_{BE_2}+V_{EB_1}-V_1}{I_P}\right]\left[1+h_{FE_2}\right]$$

same column 8, lines 55 and 56, the formula should appear as shown below instead of as in the patent:

$$R_2=\frac{(V_{BE_2}+V_{EB_1}-V_1)\ (1+h_{FE_2})R_n}{V_V}$$

Signed and sealed this 29th day of November 1966.

(SEAL)
Attest:

ERNEST W. SWIDER
Attesting Officer

EDWARD J. BRENNER
Commissioner of Patents